United States Patent
Steiner

(10) Patent No.: US 10,635,385 B2
(45) Date of Patent: Apr. 28, 2020

(54) METHOD AND APPARATUS FOR INTERFACING WITH WIRELESS EARPIECES

(71) Applicant: BRAGI GmbH, München (DE)

(72) Inventor: Martin Steiner, München (DE)

(73) Assignee: BRAGI GmbH, Müchen (DE)

( * ) Notice: Subject to any disclaimer, the term of this patent is extended or adjusted under 35 U.S.C. 154(b) by 44 days.

(21) Appl. No.: 15/350,020

(22) Filed: Nov. 12, 2016

(65) Prior Publication Data

US 2017/0139668 A1  May 18, 2017

Related U.S. Application Data

(60) Provisional application No. 62/255,309, filed on Nov. 13, 2015.

(51) Int. Cl.
*G10H 7/00* (2006.01)
*G06F 3/16* (2006.01)
*H04R 1/10* (2006.01)

(52) U.S. Cl.
CPC ........... *G06F 3/165* (2013.01); *H04R 1/1091* (2013.01); *H04R 1/1016* (2013.01); *H04R 2201/103* (2013.01); *H04R 2420/07* (2013.01)

(58) Field of Classification Search
CPC combination set(s) only.
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |
| 5,280,524 A | 1/1994 | Norris |
| 5,295,193 A | 3/1994 | Ono |
| 5,298,692 A | 3/1994 | Ikeda et al. |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — Amir H Etesam
(74) *Attorney, Agent, or Firm* — Goodhue, Coleman & Owens, P.C.

(57) ABSTRACT

A system includes at least one wireless ear piece comprising an ear piece housing and a wireless transceiver disposed within the ear piece housing, a software application for executing on a computing device having a display associated therewith, and wherein the software application provides a user interface for use by a user of the at least one wireless ear piece to interact with the at least one ear piece.

16 Claims, 10 Drawing Sheets

(56) References Cited

U.S. PATENT DOCUMENTS

| | | |
|---|---|---|
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| 6,408,081 B1 | 6/2002 | Boesen |
| 6,424,820 B1 | 7/2002 | Burdick et al. |
| 6,470,893 B1 | 10/2002 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,022,906 B2* | 4/2006 | Georges ............... G10H 1/0025 84/609 |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,979,035 B2 | 7/2011 | Griffin et al. |
| 7,983,628 B2 | 7/2011 | Boesen |
| 8,095,188 B2 | 1/2012 | Shi |
| 8,140,357 B1 | 3/2012 | Boesen |
| 8,300,864 B2 | 10/2012 | Müllenborn et al. |
| 8,436,780 B2 | 5/2013 | Schantz et al. |
| 8,719,877 B2 | 5/2014 | VonDoenhoff et al. |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0132511 A1* | 7/2004 | Yamamoto .......... H04M 1/0214 455/575.3 |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0021577 A1* | 1/2008 | Ijichi ................... G11B 27/034 700/94 |
| 2008/0031475 A1* | 2/2008 | Goldstein ............... H04M 1/05 381/151 |
| 2008/0154098 A1* | 6/2008 | Morris ............... A61B 5/02416 600/300 |
| 2008/0254780 A1 | 10/2008 | Kuhl et al. |
| 2009/0073070 A1 | 3/2009 | Rofougaran |
| 2010/0172522 A1 | 7/2010 | Mooring et al. |
| 2010/0203831 A1 | 8/2010 | Muth |
| 2013/0329051 A1* | 12/2013 | Boesen .................. H04M 1/05 348/159 |
| 2014/0189600 A1* | 7/2014 | Lee ........................ G06F 3/017 715/856 |
| 2015/0131814 A1 | 5/2015 | Usher et al. |
| 2015/0234187 A1 | 8/2015 | Lee |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, a Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, the Charger, the SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).

(56) References Cited

OTHER PUBLICATIONS

BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & the BRAGI News (Feb. 21, 2014).
The Dash—A Word From Our Software, Mechanical and Acoustics Team + an Update (Mar. 11, 2014).
Update From BRAGI—$3,000,000—Yipee (Mar. 22, 2014).
Weisiger, "Conjugated Hyperbilirubinemia", (Jan. 5, 2016).

\* cited by examiner

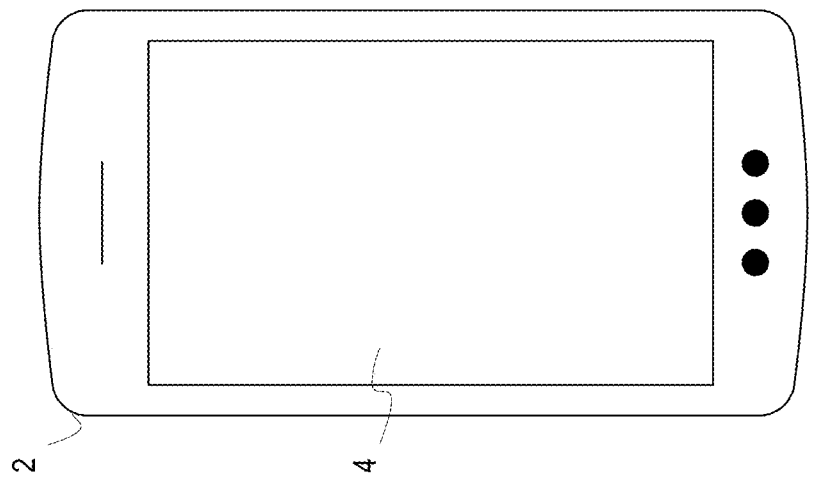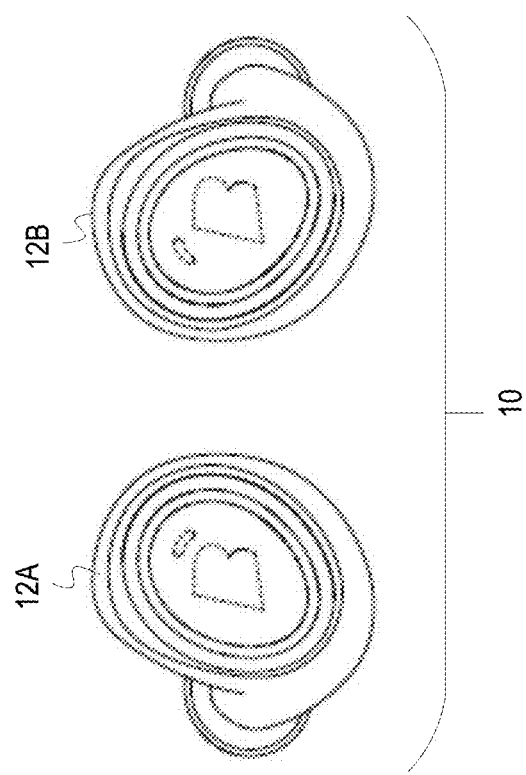
FIG. 1

METHOD AND APPARATUS FOR INTERFACING WITH WIRELESS EARPIECES

PRIORITY STATEMENT

This application claims priority to U.S. Provisional Patent Application 62/255,309, filed on Nov. 13, 2015, and entitled Method and apparatus for interfacing with wireless earpieces, hereby incorporated by reference in its entirety.

FIELD OF THE INVENTION

The present invention relates to wearable devices. More particularly, but not exclusively, the present invention relates to ear pieces.

BACKGROUND

Wireless ear pieces may include various functionality. What is needed is a software application which may execute on a computing device such as a mobile device to allow a user to interact with the wireless ear pieces to improve functionality and user satisfaction.

SUMMARY

Therefore, it is a primary object, feature, or advantage of the present invention to improve over the state of the art.

It is a further object, feature, or advantage of the present invention to provide a software application for communicating with one or more wireless ear pieces.

It is a still further object, feature, or advantage of the present invention to provide a software application with features which support music playback functionality associated with one or more wireless ear pieces.

Another object, feature, or advantage is to provide a software application with features which support various types of activity monitoring and recording functionality associated with one or more wireless ear pieces.

Yet another object, feature, or advantage is to provide a system with improved functionality.

Another object, feature, or advantage is to improve user satisfaction of one or more wireless ear pieces.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, a system includes at least one wireless ear piece comprising an ear piece housing and a wireless transceiver disposed within the ear piece housing, a software application for executing on a computing device having a display associated therewith, and wherein the software application provides a user interface for use by a user of the at least one wireless ear piece to interact with the at least one ear piece.

According to another aspect, a method for controlling a set of wireless ear pieces includes providing a software application for controlling the set of wireless ear pieces, the software application adapted to execute on a computing device, using the software application on the computing device to display one or more screen displays on a display of the computing device and to receive input from the user into the mobile device, communicating data associated with the input between the software application and at least one of the wireless ear pieces, and performing an action using at least one of the wireless ear pieces in response to receiving the data.

According to another aspect, a method for communicating data from a set of wireless ear pieces includes providing a software application for communicating with the set of wireless ear pieces, the software application adapted to execute on a computing device, using the software application on the computing device to display one or more screen displays on a display of the computing device, communicating data received from one or more of the wireless ear pieces to the computing device, and updating the screen displays on the display of the computing device using the data.

BRIEF DESCRIPTION OF THE DRAWINGS

FIG. 1 illustrates a system including a set of wearable ear pieces and a mobile device.

Various of the figures include ornamental appearance for various elements. It is to be understood that the present invention contemplates all permutations and combinations of the various graphical elements set forth in the screen displays and any portions thereof.

DETAILED DESCRIPTION

The present invention relates to wearable devices. More particularly, but not exclusively, the present invention relates to ear pieces. According to some aspects, the present invention relates to sets of wearable devices, that is to say a set or group of more than one devices that communicate with one another and/or with another device. Thus, for example, where the wearable devices are wireless ear pieces, the set may include a left wireless ear piece and a right ear piece.

FIG. 1 illustrates a set of ear pieces 10 including a left ear piece 12A and a right ear piece 12B. Each of the left ear piece 12A and the right ear piece 12B is in operative communication with a mobile device 4 which includes a screen 6. The screen display 6 may be touch-sensitive screen display or the mobile device 4 may otherwise provide for manual inputs.

Figure 2:
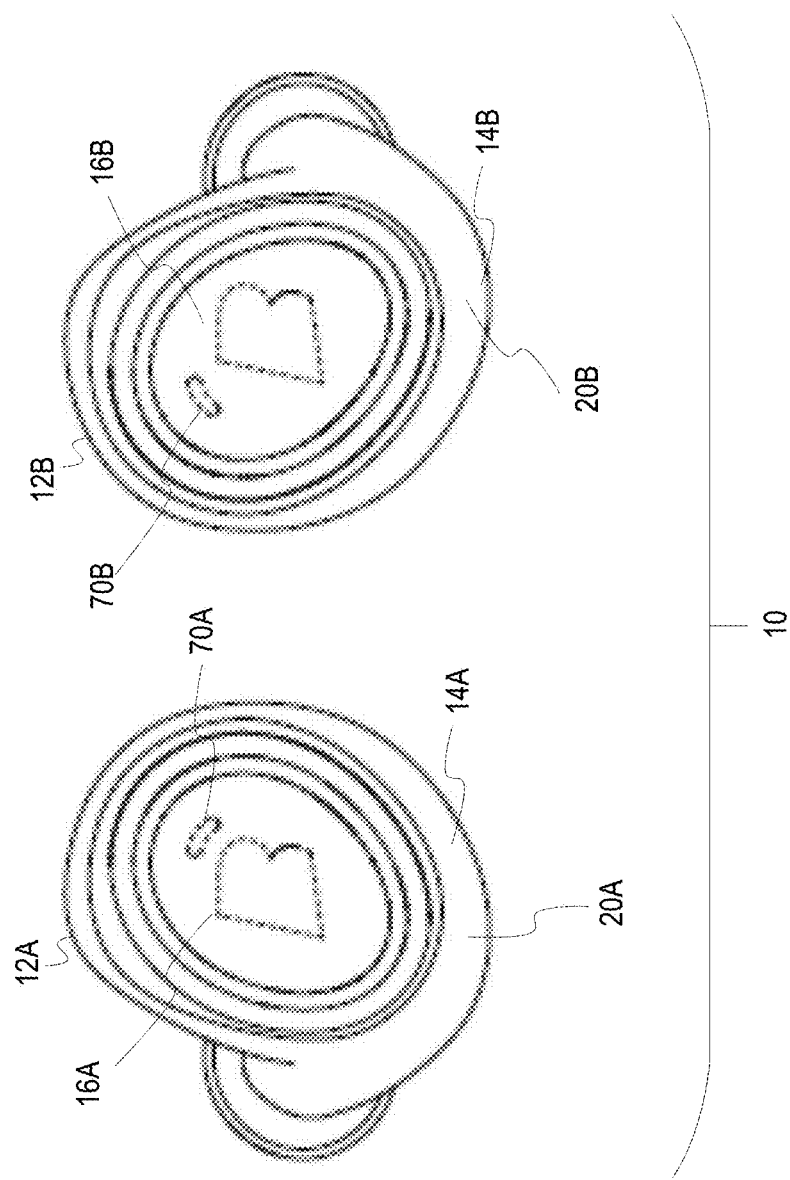
FIG. 2 illustrates a set of wearable ear pieces in greater detail.

FIG. 2 illustrates in greater detail the set of earpiece wearables 10 which includes a left earpiece 12A and a right earpiece 12B. Each of the earpieces wearables 12A, 12B has an earpiece wearable housing 14A, 14B which may be in the form of a protective shell or casing and may be an in-the-ear earpiece housing. A left infrared through ultraviolet spectrometer 16A and right infrared through ultraviolet spectrometer 16B is also shown. Each earpiece 12A, 12B may include one or more microphones 70A, 70B. Note that the air microphones 70A, 70B are outward facing such that the air microphones 70A, 70B may capture ambient environmental sound. It is to be understood that any number of microphones may be present including air conduction microphones, bone conduction microphones, or other audio sensors.

Figure 3:
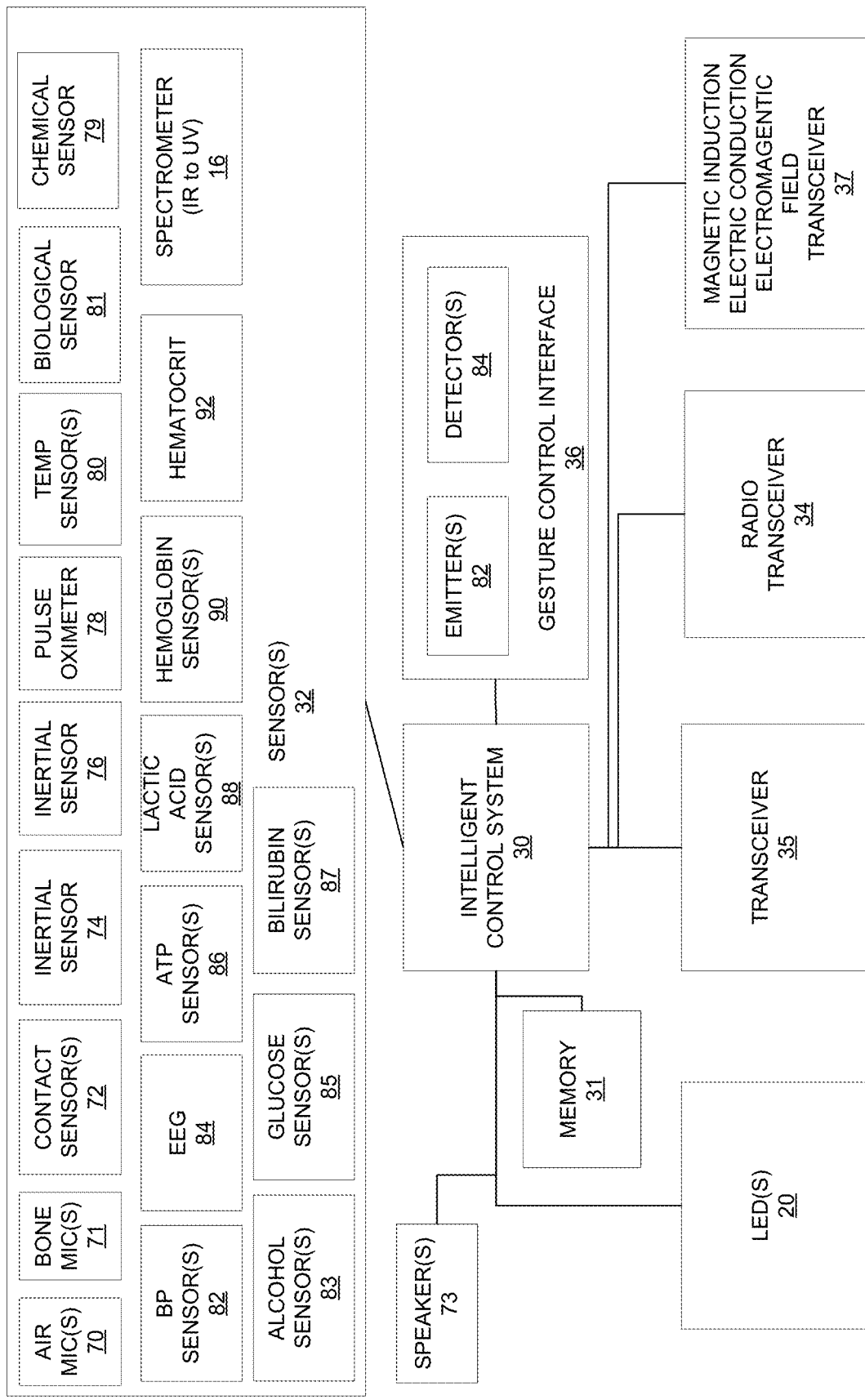
FIG. 3 is a block diagram illustrating one example of an ear piece.

FIG. 3 is a block diagram illustrating the left ear piece or the right ear piece wearable. The ear piece wearable device may include one or more LEDs 20 electrically connected to an intelligent control system 30. The intelligent control system 30 may include one or more processors, microcontrollers, application specific integrated circuits, or other types of integrated circuits. The intelligent control system 30 may also be operatively connected to a memory 31 which may be of any number of various types of memories including a solid state memory. The memory 31 may be used for various purposes including to store audio or programming. For example, users may load audio files such as MP3 files into the memory 31 of the earpiece wearable for playback. Alternatively, software updates may be loaded into the memory 31 for execution by the ear piece wearable. The intelligent control system 30 may also be electrically connected to one or more sensors 32. Where the device is an earpiece, the sensor(s) may include an inertial sensor 74, another inertial sensor 76. Each inertial sensor 74, 76 may include an accelerometer, a gyro sensor or gyrometer, a magnetometer or other type of inertial sensor. The sensor(s) 32 may also include one or more contact sensors 72, one or more bone conduction microphones 71, one or more air conduction microphones 70, one or more chemical sensors 79, a pulse oximeter 76, a temperature sensor 80, or other physiological or biological sensor(s). Further examples of physiological or biological sensors include an alcohol sensor 83, glucose sensor 85, or bilirubin sensor 87. Other examples of physiological or biological sensors may also be included in the device. These may include a blood pressure sensor 82, an electroencephalogram (EEG) 84, an Adenosine Triphosphate (ATP) sensor, a lactic acid sensor 88, a hemoglobin sensor 90, a hematocrit sensor 92 or other biological or chemical sensor.

A spectrometer 16 is also shown. The spectrometer 16 may be an infrared (IR) through ultraviolet (UV) spectrometer although it is contemplated that any number of wavelengths in the infrared, visible, or ultraviolet spectrums may be detected. The spectrometer 16 is preferably adapted to measure environmental wavelengths for analysis and recommendations and thus preferably is located on or at the external facing side of the device.

A gesture control interface 36 is also operatively connected to or integrated into the intelligent control system 30. The gesture control interface 36 may include one or more emitters 82 and one or more detectors 84 for sensing user gestures. The emitters may be of any number of types including infrared LEDs. The device may include a transceiver 35 which may allow for induction transmissions such as through near field magnetic induction. A short range transceiver 34 using Bluetooth, BLE, UWB, or other means of radio communication may also be present. In operation, the intelligent control system 30 may be configured to convey different information using one or more of the LED(s) 20 based on context or mode of operation of the device. The various sensors 32, the processor 30, and other electronic components may be located on the printed circuit board of the device. One or more speakers 73 may also be operatively connected to the intelligent control system 30.

A magnetic induction, electric conduction, or other type of electromagnetic (E/M) field transceiver 37 or other type of transceiver is also operatively connected to the intelligent control system 30 to link the processor 30 to the electromagnetic field of the user. The use of the transceiver 37 allows the device to link electromagnetically into a personal area network or body area network or other device.

Although a number of different components are shown in FIG. 3, it is to be understood that an ear piece wearable need not include all of the various components and may only include a subset of the components. For example, in one embodiment the ear pieces only serves as a set of wireless earpieces without microphones, without physiological sensors, and need not include storage. It is to be further understood that where there is a set of ear pieces some of the components may be present only in one of the ear pieces within the set. For example, not all sensors 32 need be present in each ear piece. In a further example, the earpiece need not include any biometric or physiological sensors or environmental sensors and need not include a gestural interface or inertial sensors or even the memory for storage of audio files. It is also to be understood that the earpiece may have various different modes of operations. For example, different types of exercises may have different modes of operations which may be sensed with different combinations of sensors. In addition, different modes of operations include different audio modes of operations. One example of an audio mode of operation is an audio transparency mode. In the audio transparency mode, environmental audio is sensed using one or more microphones positioned to detect ambient or environmental noise. This audio is reproduced after optional processing at a speaker of the ear piece. Thus, audio from the environment may be combined with other audio so that a user wearing the earpieces is still wearing the earpieces which may physically block the ear canal but the user is still able to hear environmental audio.

Figure 4:
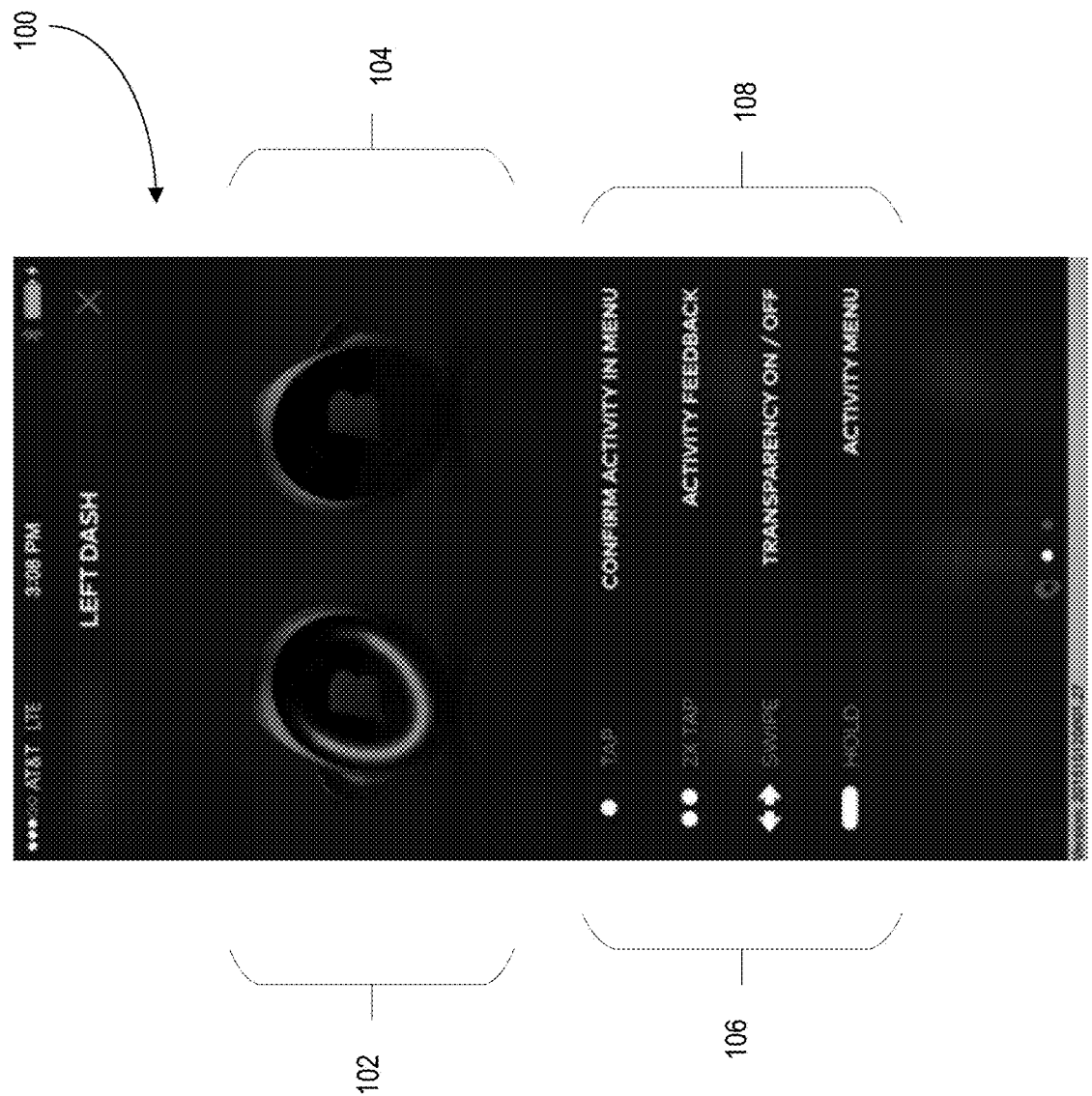
FIG. 4 illustrates one example of a screen display associated with a left ear piece.

FIG. 4 illustrates one example of a screen display 100 associated with a software application or mobile app executing on a processor of a mobile device. The screen display 100 illustrates both a left ear piece 102 and a right-ear-piece 104. The screen display 100 includes a caption or label indicating the "left" ear piece. In addition, portions of the left ear piece 102 are illuminated using one or more LEDs. This portion of the ear piece may be called a corona. Thus, a user using the mobile app may quickly and easily make the association between the left ear piece 102 which they are wearing and what is shown on the screen display. Note that a right ear piece 104 is also shown, however the corona of the right ear piece 104 is note lit. Under the representation of the ear pieces 102, 104 which may be a photo or photo-realistic representation of the ear pieces is information relating to the gestures or controls associated with the ear piece. The information presented is for the ear piece which is lit, namely the left earpiece 102. Note that textual descriptions of the commands 108 are shown at the right and a pictorial representation or symbol or icon or graphic associated with the gesture 106 is shown at left. Thus, here, a single dot is shown which is intended to correspond with a single tap or "TAP." The function associated with this user control, in this instance "CONFIRM ACTIVITY IN MENU" is shown. Next, two dots are shown which intended to correspond with a double tap or "2λ TAP." The function associated with this user control, in this instance, "ACTIV- ITY FEEDBACK" is shown. Next, a left pointing arrow adjacent a right point arrow is shown. This visual representation is intended to correspond with a swipe or "SWIPE." The function associated with this user input, in this instance, "TRANSPARENCY ON/OFF" is shown. This may be an audio transparency mode as has previously been discussed. Next, an ellipse or oblong shape is shown. This visual representation is intended to correspond with a hold or "HOLD." The function associated with this user input, in this instance "ACTIVITY MENU" is shown. Thus, the screen display of FIG. 4 illustrates that a user may perform various actions through manipulation of the left ear piece using a set of gestures which may include a single tap, a double tap, a swipe, and/or a hold. Of course other types of gestures are contemplated including triple taps, gestures with particular directionality (e.g. left to right, right to left, down, up, diagonal down and to the right, diagonal up and to the right, diagonal down and to the left, diagonal up and to the left, and other variation.

Figure 5:
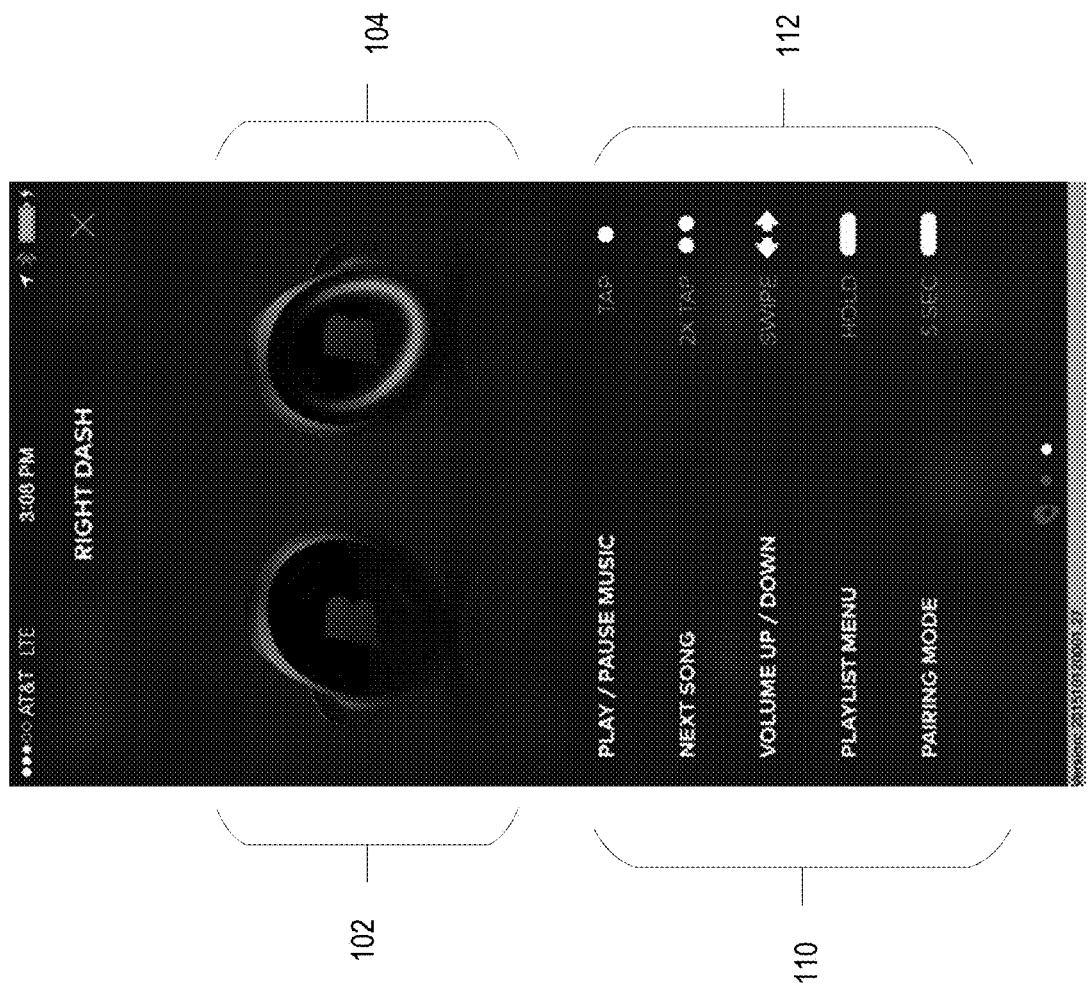
FIG. 5 illustrates one example of a screen display associated with a right ear piece.

FIG. 5 illustrates another example of a screen display associated with a software application or mobile app executing on a processor of a mobile device. The screen display illustrates both a left ear piece 102 and a right ear piece 104. Note that as shown in FIG. 5, the corona of the right earpiece 104 is let. The screen display includes a caption or label indicating the "right" ear piece. In additions, portions of the right ear piece are illuminated using one or more LEDs. This portion of the ear piece may be called a corona. Thus, a user using the mobile app may quickly and easily make the association between the right ear piece which they are wearing and what is shown on the screen display. Under the representation of the ear pieces 102, 104 which may be a photo or photo-realistic representation of the ear pieces is information relating to the gestures or controls associated with the ear piece. Note that textual descriptions of the commands 110 are shown at the left and a pictorial representation or symbol or icon or graphic associated with the gesture 112 is shown at right. Thus, here a single dot is shown which is intended to correspond with a single tap or "TAP." The function associated with this user control, in this instance "PLAY/PAUSE MUSIC" is shown. Next, two dots are shown which intended to correspond with a double tap or "2×TAP." The function associated with this user control, in this instance, "NEXT SONG" is shown. Next, a left pointing arrow adjacent a right point arrow is shown. This visual representation is intended to correspond with a swipe or "SWIPE." The function associated with this user input, in this instance, "VOLUME UP/DOWN" is shown. Next, an ellipse or oblong shape is shown. This visual representation is intended to correspond with a hold or "HOLD." The function associated with this user input, in this instance "PLAYLIST MENU" is shown. Thus, the screen display of FIG. 5 illustrates that a user may perform various actions through manipulation of the right ear piece using a set of gestures which may include a single tap, a double tap, a swipe, and/or a hold.

Note also, that as shown in FIG. 4 and FIG. 5, the same gestures may perform different actions depending upon whether the gesture is performed on the left ear piece or the right ear piece. It is contemplated, however, that different gestures may be used on different ear pieces and the same gestures may perform the same functions on different ear pieces. In addition, instead of using the gesture control of the ear pieces to perform particular actions other types of user input may be used as well. This includes voice control or using the interface associated with the device executing the software application such as a touchscreen or manual inputs.

Figure 6:
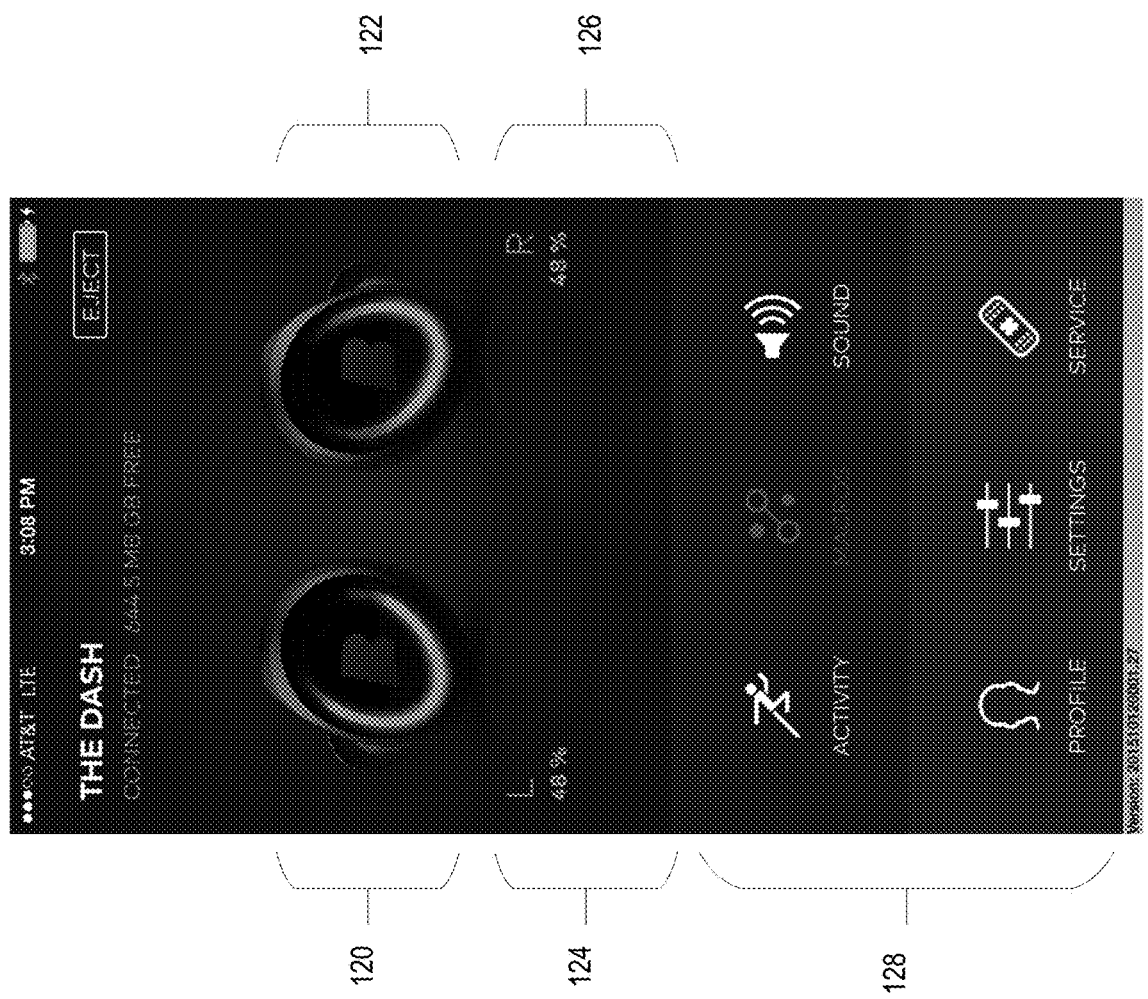
FIG. 6 illustrates another example of a screen display showing charge levels of both a left ear piece and a right ear piece and an activity menu with various items.

FIG. 6 illustrates another example of a screen display associated with a software application or mobile app executing on a processor of a mobile device. In this screen display a left earpiece 120 and a right earpiece 122 are shown. Underneath the left ear piece 120 is an "L" indicating that this is the left ear piece. Underneath the "L" is textural information in the form of a numerical representation 124 of remaining battery life for the left ear piece, in this instance, "48%." Underneath the right ear piece is an "R" indicating that this is the right ear piece. Underneath the "R" is textual information in the form of a numerical representation 126 of remaining battery life for the right ear piece, in this instance, "48%." Although the battery charge level or remaining battery life is the same for both the left ear piece and the right ear piece in this example, it is to be understood that the left ear piece and the right ear piece may be different and that charge levels may be independently determined for each ear piece.

Below the representations of the ear pieces is a menu 128 which includes various functions associated with the ear pieces. These include an "ACTIVITY" menu item, a "MACROS" menu item, a "SOUND" menu item, a "PROFILE" menu item, a "SETTINGS" menu item, and a "SERVICE" menu item.

Figure 7:
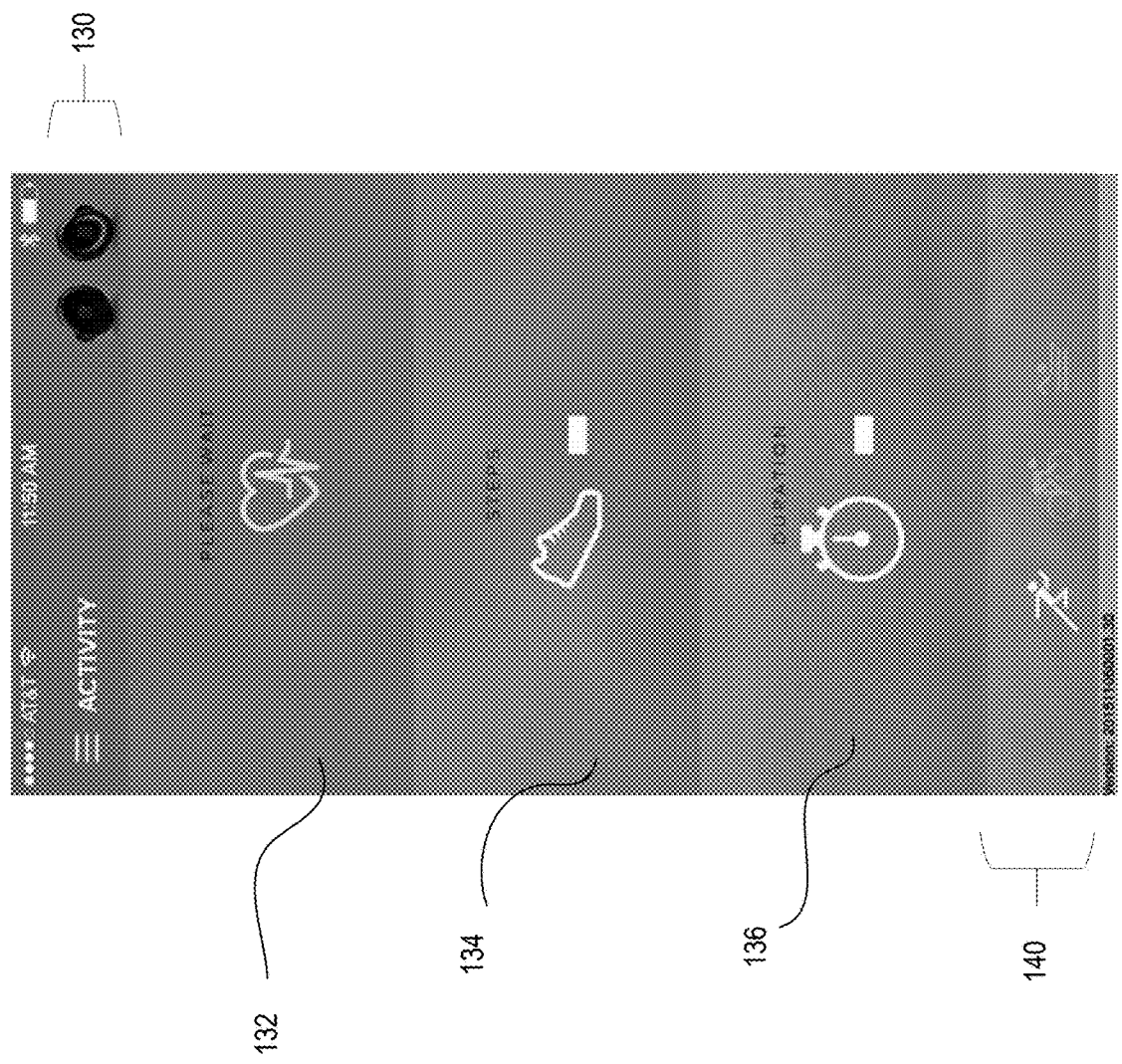
FIG. 7 illustrates an example of a screen display showing monitoring information associated with a selected activity.

FIG. 7 illustrates another example of a screen display, in this instance the screen display is for tracking activity. At the top right of the screen display is a representation of a pair of earpieces 130. The presence of the earpieces may indicate the earpieces are connected. The earpieces 130 shown may be in the form of a pictorial representation of the earpieces being used and of the same model, color, etc. Various information associated with one or more activities may be displayed. This may include heart rate 132, number of steps 134, duration 136 or different information which may vary based on the type of activity. For example, instead of number of steps 134, distance may be shown. On the bottom of the screen display are three different icons or visual representations of different activities 140. The activities shown are running or jogging (left), biking (middle), and swimming (right). The selected activity as shown in FIG. 7 is running or jogging. Various information associated with this activity is also shown. This may include heart rate 132 as measured by one or more of the ear pieces such as through use of a pulse oximeter, steps 134, as measured by one or more of the ear pieces such as through use of an inertial sensor, and duration 136.

Figure 8:
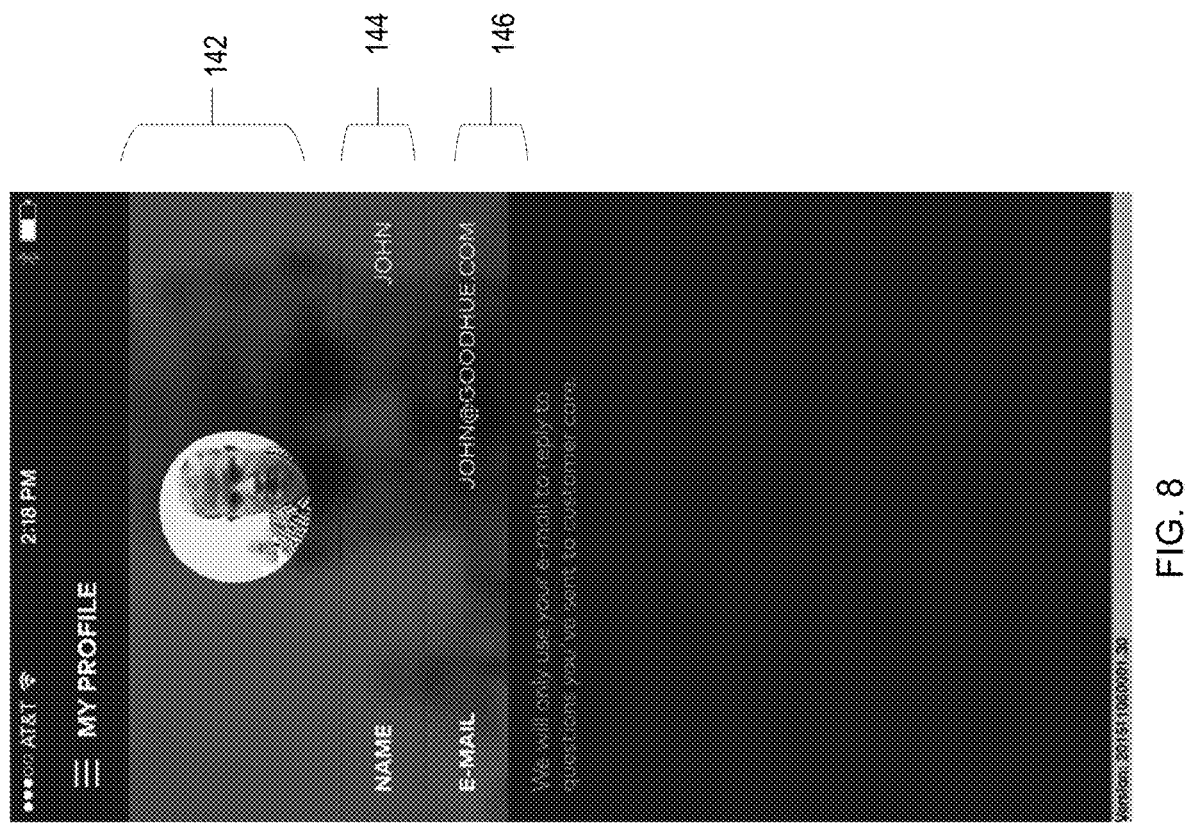
FIG. 8 illustrates an example of a screen display showing profile information for an individual or user.

FIG. 8 illustrates another example of a screen display. In this instance the screen display is for displaying a "MY PROFILE" which may be used to include information about a user. For example, the information may include a name 144, email address 146, or other information including a photo 142.

Figure 9:
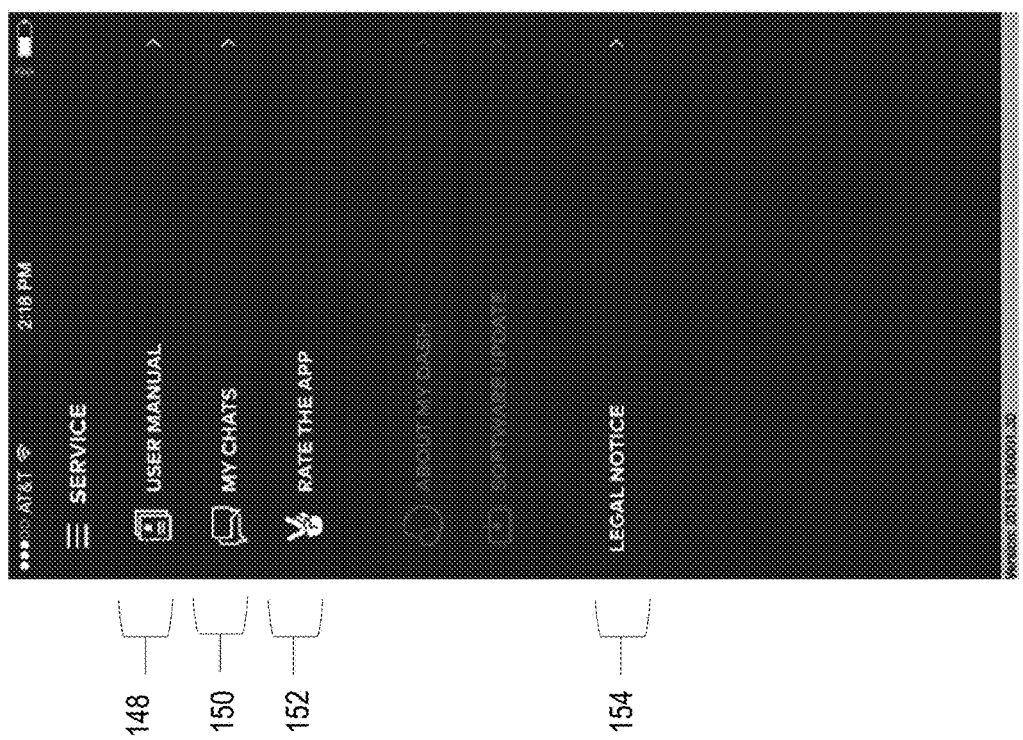
FIG. 9 illustrates an example of a screen display showing service information.

FIG. 9 illustrates another example of a screen display. In this instance, the screen display is for displaying "SERVICE" information. This may include various options including the ability to view a "USER MANUAL" 148, to view "MY CHATS" 150 which may be chats with service or support representatives, to "RATE THE APP" 152 or to view any "LEGAL NOTICE" 154.

Figure 10:
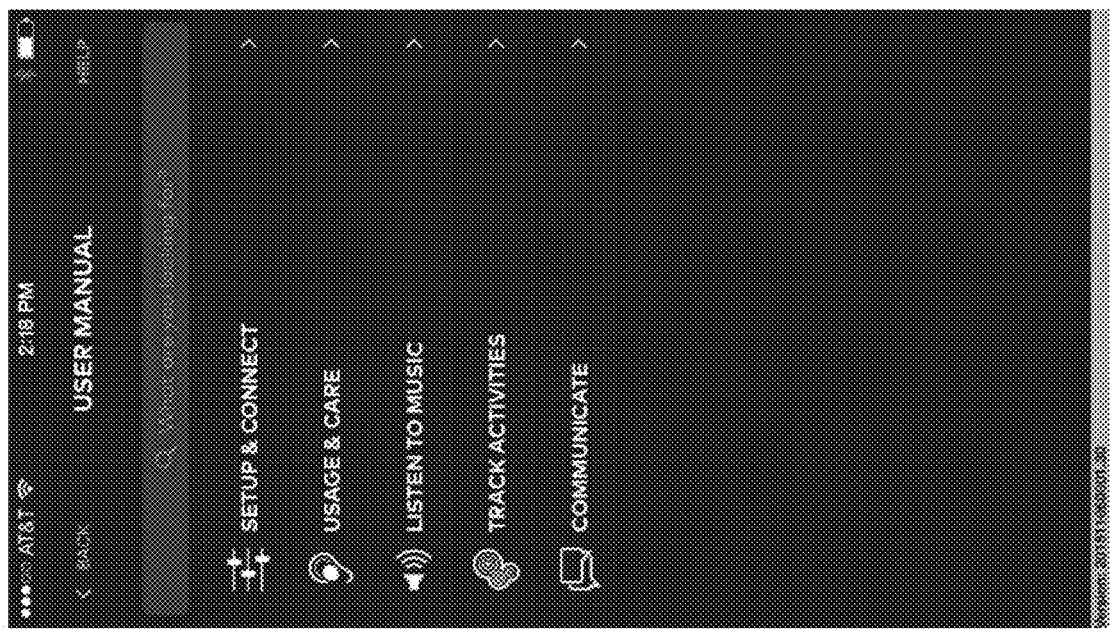
FIG. 10 illustrates an example of a screen display showing a user manual.

FIG. 10 illustrates another example of a screen display. In this instance the screen display is for displaying the "USER'S MANUAL" which may be organized in various ways including a "SETUP & CONNECT" portion 156, a "USAGE & CARE" portion 158, a "LISTEN TO MUSIC" portion 160, a "TRACK ACTIVITIES" portion 162, and a "COMMUNICATE" portion 164.

It is to be understood that an application may be developed for any number of operating systems or platforms and may be distributed in any number of ways. These may include that the app be developed for the iOS operating system for an Apple mobile device such as an iPhone or iPad and distributed through the App Store. The app may be developed for the Android operating system for an Android device and distributed through Google Play or another Android app marketplace. The app may be developed for Windows or for any number of other operating systems.

Although various examples have been shown and described throughout, it is to be understood that the present invention contemplates numerous options, variations, and alternatives. The present invention is not to be limited to the specific disclosure provided herein.

What is claimed is:

1. A system comprising:
   at least one wireless ear piece comprising an ear piece housing and a wireless transceiver disposed within the ear piece housing;
   a software application for executing on a computing device having a display associated therewith;
   wherein the software application configured to display one or more screen displays on a display of the computing device;
   wherein the software application provides a user interface for use by a user of the at least one wireless ear piece to interact with the at least one wireless ear piece; and
   wherein the user interface is configured to display a visual representation of the at least one wireless ear piece on at least one of the one or more screen displays, the visual representation indicative of a function or property of the at least one wireless ear piece communicated from the at least one wireless earpiece to the computing device.

2. The system of claim 1 wherein the at least one wireless earpiece comprises a physiological sensor.

3. The system of claim 2 wherein the software application provides for tracking one or more physical activities using the physiological sensor.

4. The system of claim 3 wherein the physical activities are selected from a set consisting of running, biking, and swimming.

5. The system of claim 1 wherein the representation visual representation includes lighting of the at least one wireless ear piece.

6. The system of claim 5 wherein the lighting is associated with the function or property of the at least one wireless ear piece.

7. The system of claim 6 wherein the property is remaining battery life.

8. The system of claim 1 wherein the user interface is further configured to display available gestures associated with controlling the at least one wireless ear piece.

9. The system of claim 1 wherein the at least one wireless ear piece comprises onboard storage for storing audio files.

10. The system of claim 1 wherein the at least one wireless ear piece is configured to store at least one playlist of audio files.

11. The system of claim 1 wherein the software application provides for connecting the at least one wireless ear piece with the computing device.

12. The system of claim 11 wherein the computing device is a mobile device.

13. A method for controlling a set of wireless ear pieces, the method comprising:
    providing a software application for controlling the set of wireless ear pieces, the software application adapted to execute on a computing device;
    using the software application on the computing device to display one or more screen displays on a display of the computing device and to receive input from the user into the mobile device, wherein at least one of the one or more screen displays display a visual representation of the set of wireless ear pieces;
    communicating data associated with the input between the software application and at least one of the wireless ear pieces;
    performing an action using at least one of the wireless ear pieces in response to receiving the data.

14. A method for communicating data from a set of wireless ear pieces, the method comprising:
    providing a software application for communicating with the set of wireless ear pieces, the software application adapted to execute on a computing device;
    using the software application on the computing device to display one or more screen displays on a display of the computing device, wherein at least one of the one or more screen displays display a visual representation of the set of wireless ear pieces;
    communicating data received from one or more of the wireless ear pieces to the computing device; and
    updating the screen displays on the display of the computing device using the data.

15. The method of claim 14 wherein the data comprises physiological data.

16. The method of claim 15 wherein the physiological data is heart rate data.

\* \* \* \* \*

(12) INTER PARTES REVIEW CERTIFICATE (3867th)

United States Patent
Steiner

(10) Number: US 10,635,385 K1
(45) Certificate Issued: Feb. 7, 2025

(54) METHOD AND APPARATUS FOR INTERFACING WITH WIRELESS EARPIECES

(71) Applicant: Martin Steiner

(72) Inventor: Martin Steiner

(73) Assignee: BRAGI GMBH

Trial Number:

IPR2023-00901 filed May 10, 2023

Inter Partes Review Certificate for:

Patent No.: 10,635,385
Issued: Apr. 28, 2020
Appl. No.: 15/350,020
Filed: Nov. 12, 2016

The results of IPR2023-00901 are reflected in this inter partes review certificate under 35 U.S.C. 318(b).

INTER PARTES REVIEW CERTIFICATE
U.S. Patent 10,635,385 K1
Trial No. IPR2023-00901
Certificate Issued Feb. 7, 2025

AS A RESULT OF THE INTER PARTES REVIEW PROCEEDING, IT HAS BEEN DETERMINED THAT:

Claims 1-16 are cancelled.

\* \* \* \* \*